US008751565B1

(12) United States Patent
Jia

(10) Patent No.: US 8,751,565 B1
(45) Date of Patent: Jun. 10, 2014

(54) COMPONENTS FOR WEB-BASED CONFIGURABLE PIPELINE MEDIA PROCESSING

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 279 days.

(21) Appl. No.: 13/206,991

(22) Filed: Aug. 10, 2011

Related U.S. Application Data

(60) Provisional application No. 61/440,825, filed on Feb. 8, 2011.

(51) Int. Cl.
 *G06F 15/16* (2006.01)
(52) U.S. Cl.
 USPC .......................................... 709/203; 709/201
(58) Field of Classification Search
 USPC .................................. 709/201, 203
 See application file for complete search history.

(56) References Cited

U.S. PATENT DOCUMENTS

2003/0229900 A1* 12/2003 Reisman ......................... 725/87
2005/0125734 A1* 6/2005 Mohammed et al. ......... 715/731
2005/0251856 A1* 11/2005 Araujo et al. ................... 726/12

OTHER PUBLICATIONS

The Khronos Group Inc. OpenMAX Integration Layer Application Programming Interface Specification. Version 1.12. Copyright, 2008.
Rosenberg, J. D. RTCWEB I-D with thoughts on the framework. Feb. 8, 2011. Retrieved from http://www.ietf.org/mail-archive/web/dispatch/current/msg03383.html on Aug. 1, 2011.
Rosenberg, J.D., et al. An Architectural Framework for Browser based Real-Time Communications (RTC) draft-rosenberg-rtcweb-framework-00. Feb. 8, 2011. Retrieved from http://www.ietf.org/id/draft-rosenberg-rtcweb-framework-00.txt on Aug. 1, 2011.
U.S. Appl. No. 13/206,973, filed Aug. 10, 2011.
U.S. Appl. No. 13/206,986, filed Aug. 10, 2011.
U.S. Appl. No. 13/206,996, filed Aug. 10, 2011.

* cited by examiner

*Primary Examiner* — Wing F Chan
*Assistant Examiner* — Andrew Woo
(74) *Attorney, Agent, or Firm* — Young Basile Hanlon & MacFarlane P.C.

(57) ABSTRACT

An apparatus and method relating to components for web-based configurable pipeline media processing is disclosed. The disclosed embodiments include a web browser implemented on a computing device. The web browser includes a web application processor for processing a web application that includes instructions to process a media stream using one or more configurable pipelines, each configurable pipeline including a plurality of components, and at least some components of the plurality of components including at least one input port configured to receive input data from a previous pipeline component, the input data derived from the media stream, at least one output port configured to send output data to a next pipeline component, and a processing module configured to process the input data into output data.

18 Claims, 9 Drawing Sheets

COMPONENTS FOR WEB-BASED CONFIGURABLE PIPELINE MEDIA PROCESSING

CROSS REFERENCE TO RELATED APPLICATIONS

This application claims priority to U.S. Provisional Patent Application Ser. No. 61/440,825, filed Feb. 8, 2011, which is incorporated herein in its entirety.

TECHNICAL FIELD

The present invention relates in general to web-based processing of media and in particular to components for web-based configurable pipeline media processing.

BACKGROUND

In the early stages of the World Wide Web (WWW), web pages generally consisted of static content (such as text and images) stored on servers. The static content was accessed and rendered by a web browser executing on a client. As the WWW has evolved, much content on the web is now dynamically generated. Such content can include web applications which include instructions to be performed by the client web browsers. Such web applications can provide a more interactive and functional experience than earlier web pages. More recent web applications now include various forms of media, including audio and video content.

SUMMARY

Disclosed herein are embodiments of methods and apparatuses for components for web-based configurable pipeline media processing.

One aspect of the disclosed embodiments is a component configured based on a standardized interface for use in a configurable pipeline created within a web browser executed on a computing device. The component includes at least one input port configured to receive input data from a previous pipeline component, the input data derived from the media stream, at least one output port configured to send output data to a next pipeline component, a command queue configured to receive commands for the components from a web application executed within the web browser, and a processing module configured to process the input data into output data, wherein the component operates in a current state selected from a plurality of states, the selected state determined based on one or more commands received from the web application.

Another aspect of the disclosed embodiments is a web browser implemented on a computing device. The web browser includes a web application processor for processing a web application that includes instructions to process a media stream using one or more configurable pipelines, each configurable pipeline including a plurality of components, and at least some components of the plurality of components including at least one input port configured to receive input data from a previous pipeline component, the input data derived from the media stream, at least one output port configured to send output data to a next pipeline component, and a processing module configured to process the input data into output data.

Another aspect of the disclosed embodiments is a method of operating a component in a media stream processing system implemented using a web browser, wherein the component is included in a configurable pipeline. The method includes initializing the component based on instructions included in a web application executed by the web browser, the initialization including creating a control channel between the web application and the component and a data channel for each of one or more input ports and each of one or more output ports of the component, the data channels operable to pass data to other components in the configurable pipeline, sending a command to the component to enter the "run" state, whereby the component will accept data via at least one of the input ports, process the accepted data, and output the processed data via at least one of the output ports, and sending a command to the component to enter the "paused" state, whereby the component will accept data via at least one of the input ports, but will not process the accepted data and will not output the processed data via the output ports.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Various solutions for including media in web applications include monolithic plugins, such as Adobe Flash and monolithic built-in browser functionality, such as the video tag included in HTML5. These solutions provide a web application high level control over a pre-defined process, such as video encoding or decoding, but do not provide customized or granular control over the process. Custom processes can require, for example, a distinct and custom programmed plugin module for the entire process. Thus, adding proprietary or other custom aspects to a process (such as Digital Rights Management (DRM), advertising overlays, video enhancements, etcetera) can be cumbersome, time-consuming, and costly. To the contrary, a modular configurable pipeline implemented in a web browser can enable a web application to configure custom processes and have granular control over those processes.

In particular, a modular configurable pipeline can be implemented using components. Generic or custom components can be arranged within a configurable pipeline to perform processing tasks. Specifically, certain components can be reused in various pipeline configurations to achieve different processing tasks. Components can be implemented in a number of different ways. In one example, components can be included as native components within a web browser. Alternatively, components can be customized and used as add-in components. The configuration of components within a configurable pipeline and which specific native and add-in components are used can be specified by a web application executed by a web browser.

Figure 1:
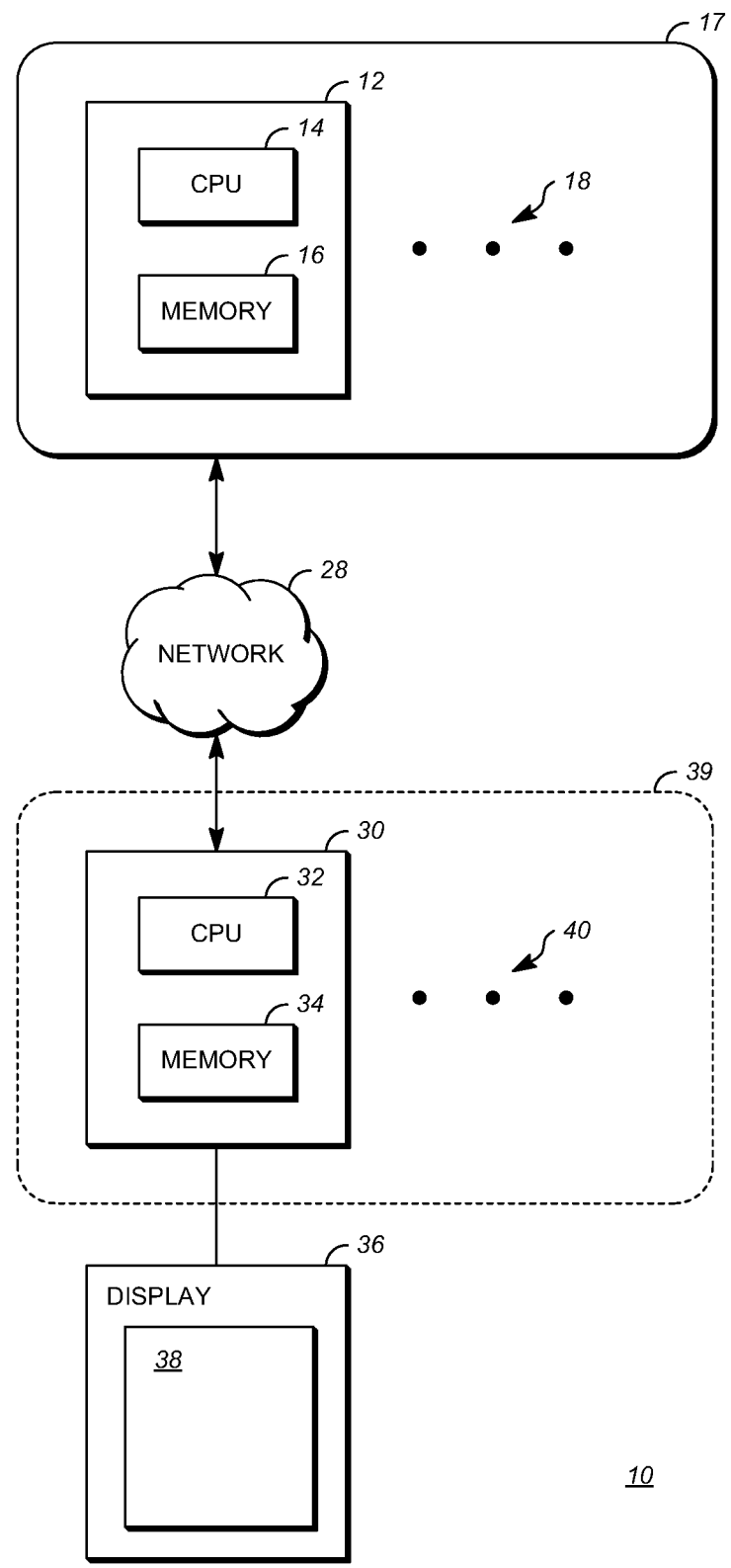
FIG. 1 is a diagram of a client-server computing scheme according to embodiments of the disclosed subject matter.

FIG. 1 is a diagram of a client-server system 10. Server 12 can be, for example, a computer having an internal configuration of hardware including a processor such as a central processing unit (CPU) 14 and a memory 16. CPU 14 can be a controller for controlling the operations of server 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of server 12 are possible.

The server 12 can be the only server or can be one of a group of servers 17 that includes additional servers 18. The group of servers 17 can be implemented as a computing cluster whereby the server 12 and additional servers 18 share resources, such as storage memory, and load-balance the processing of requests to the group of servers 17. The group of servers 17 can alternatively be a cloud computing service. For example, a cloud computing service can include hundreds or thousands of servers configured to provide scalable computing resources. In a cloud computing service, computing tasks can be performed on one or more servers or other computing devices included within the cloud computing service.

The above are only exemplary implementations of the group of servers 17, and any distributed computing model can be used in their place. As used herein and in the claims, the term "server" is understood to include any combination or implementation of servers, server groups, or any other configuration of computing devices of any kind.

A network 28 connects the servers in the group of servers 17 and a client 30 and any additional clients 40 in a group of clients 39. Network 28 is, for example, the Internet. Network 28 can also be a local area network (LAN), wide area network (WAN), virtual private network (VPN), or any other means of transferring data between the servers 17 and clients 39.

The client 30, in one example, can be a desktop computer having an internal configuration of hardware including a processor such as a central processing unit (CPU) 32 and a memory 34. CPU 32 is a controller for controlling the operations of client 30. CPU 32 can be connected to memory 34 by, for example, a memory bus. Memory 34 may be RAM or any other suitable memory device. Memory 34 stores data and program instructions which are used by CPU 32. Other suitable implementations of client 30 are possible, including handheld computing devices, laptops, or mobile telephones.

A display 36 configured to display a graphical user interface can be connected to client 30. Display 36 may be implemented in various ways, including by a liquid crystal display (LCD) or a cathode-ray tube (CRT). The display 36 can be configured to display application windows including a web browser application window 38 on client 30.

Other implementations of the client-server system 10 are possible. For example, one implementation can omit the group of servers 17 and additional servers 18 and include only a single server 12. In another implementation, there may only be one client 30 instead of the group of clients 39 and additional clients 40. In another implementation, additional components may be added to the client-server system 10. For example, one or more peripherals, such as a video camera can be attached to client 30 or some of the additional clients 40.

Figure 2:
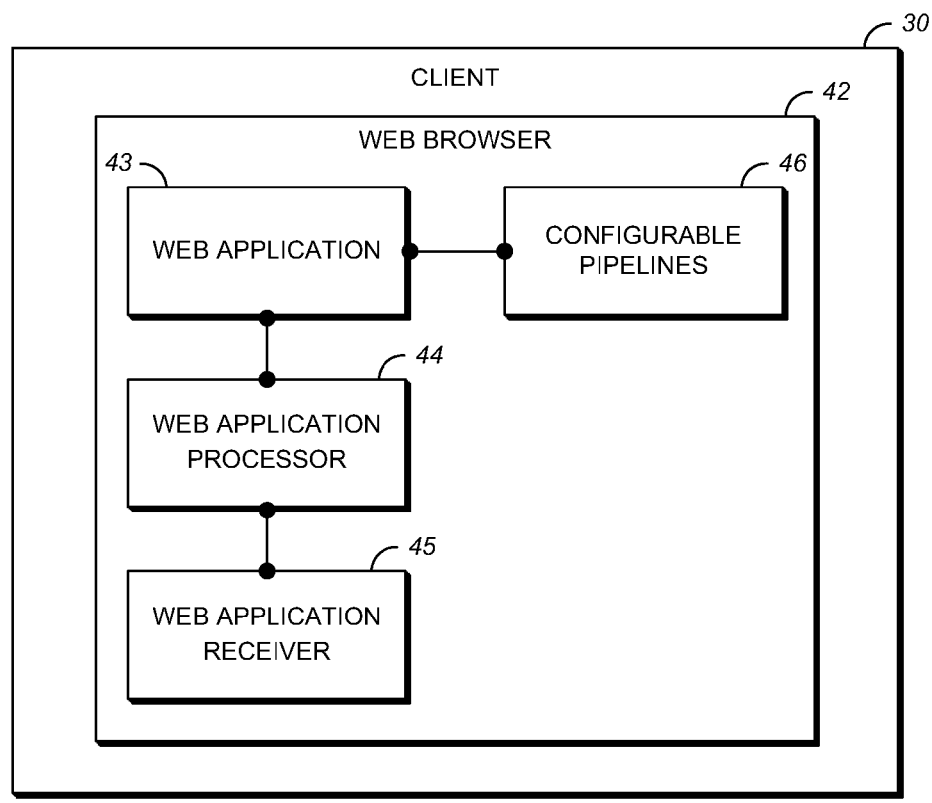
FIG. 2 is a block diagram of a web browser having configurable pipelines implemented within the client-server computing scheme of FIG. 1 according to embodiments of the disclosed subject matter.

FIG. 2 is a block diagram 41 of a web browser 42 having configurable pipelines 46 implemented within the client-server computing scheme of FIG. 1 according to embodiments of the disclosed subject matter. Web browser 42 is implemented on client 30. Web browser 42 can be in the form of computer executable instructions stored in memory 34 and executed by CPU 32. The web browser includes web application 43, web application processor 44, web application receiver 45, and configurable pipelines 46. However, other alternative configurations of web browser 42 can be utilized.

Web application 43 represents a web page that includes content to be executed on client 30 by web browser 42. For example, such content can include scripting, such as JavaScript or ECMAScript. Alternatively, web application 43 can include other content, such as Cascading Style Sheets (CSS) or other dynamic content. Web application 43 can be retrieved from a web server implemented on server 12 by way of web application receiver 45. Alternatively, web application 43 can be cached on client 30 and retrieved from client 30 instead of from server 12.

Web application processor 44 can be used to process instructions (such as script) included in web application 43. For example, a JavaScript engine can be included within web application processor 44 to interpret and execute script included in web application 43. Configurable pipelines 46 are used to process media streams by web browser 42. Configurable pipelines 46 can be initialized, configured, and controlled based on instructions (script) included in web application 43. For example, configurable pipelines 46 can be used to decode video and audio streams.

FIG. 2 is a conceptual block diagram depicting an exemplary configuration of a web browser 42 on client 30. Numerous alternative configurations are possible, including those that add to, remove from, and modify the blocks described above.

FIG. 3A-D are conceptual block diagrams of various exemplary pipeline configurations according to embodiments of the disclosed subject matter. One or more configurable pipelines can be created based on these decoder pipeline configurations. These pipeline configurations are for illustrative purposes only and numerous other configurations are possible, contemplated, and expected.

Figure 3A:
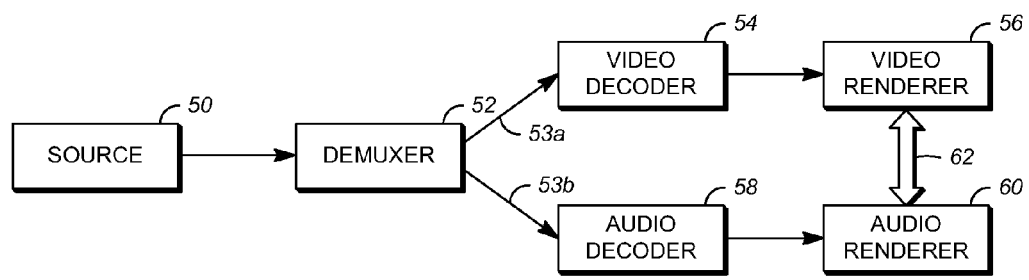
FIG. 3A-D are conceptual block diagrams of various exemplary pipeline configurations according to embodiments of the disclosed subject matter.

FIG. 3A depicts a basic configuration 48a. The basic configuration 48a includes a source 50, demuxer 52, video decoder 54, video renderer 56, audio decoder 58, audio renderer 60, and synchronization 62.

Source 50 is a source input that accepts a media stream. Source 50 can obtain the media stream directly based on a Uniform Resource Locator (URL) or other location provided by, for example, the web application 43. Alternatively, the media stream can be provided to source 50 by another component in web browser 42.

Demuxer 52 is configured to split a media stream into two streams. For example, demuxer 52 can take as input a combined video and audio stream. Demuxer 52 can take the individual video and audio streams and output them separately. In basic configuration 48a, demuxer 52 outputs the video stream as output 53a and the audio stream as output 53b.

Video decoder 54 is configured to decode the video stream output 53a. Video decoder 54 can be capable of decoding video streams encoded using one or more video encoding schemes. Video renderer 56 is configured to take the decoded video stream produced by video decoder 54 and render the decoded video stream to display 36 via, for example, web browser application window 38.

Audio decoder 58 is configured to decode the audio stream output 53b. Audio decoder 58 can be capable of decoding audio streams encoded using one or more audio encoding schemes. Audio renderer 60 is configured to take the decoded audio stream produced by audio decoder 58 and render the decoded audio stream to, for example, an audio card connected to client 30. The audio card can, for example, be connected to speakers or headphones to convert the rendered audio into sound waves. Alternative techniques for rendering audio to sound waves are available.

Synchronization 62 provides for the synchronization of rendering of the audio and video streams. In other words, synchronization 62 can ensure that video is rendered at the same time as the particular audio corresponding to the video, so that, for example, a rendered video of a person speaking (i.e. lips moving) is synchronized with the rendered audio. Synchronization 62 can be accomplished using, for example, a clock component 220 as described in FIG. 7 below.

Figure 3B:
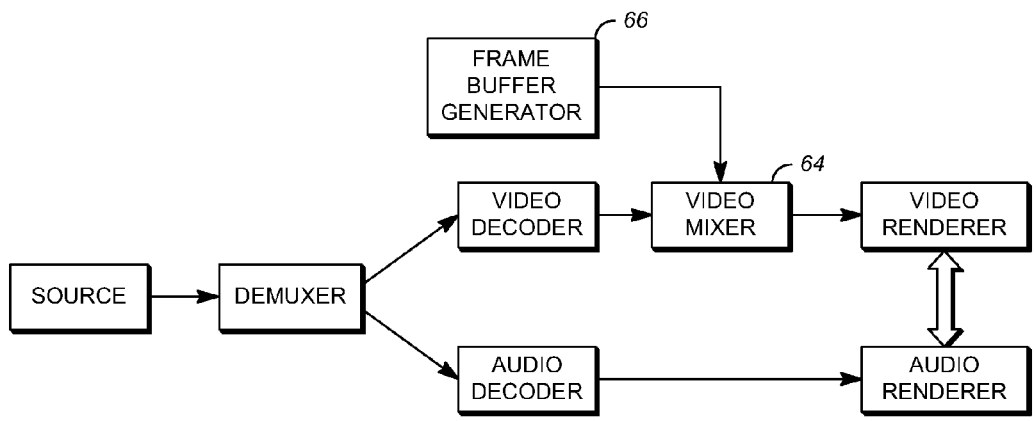

FIG. 3B depicts a mixer configuration 48b. The mixer configuration 48b includes the components of basic configuration 48a plus video mixer 64 and frame buffer generator 66. Video mixer 64 can be configured to combine video from video decoder 54 with images or video from frame buffer generator 66. For example, frame buffer generator 66 can be configured to generate images containing advertisements. Such images can then be overlaid using video mixer 64 such that the video from video decoder 54 is visible in areas where there is not an advertisement. In an alternative implementation, the video mixing can be performed using alpha-blending. In this case, the streams can be overlaid with the appearance of full or partial transparency. Other techniques of video mixing can also be used.

Figure 3C:
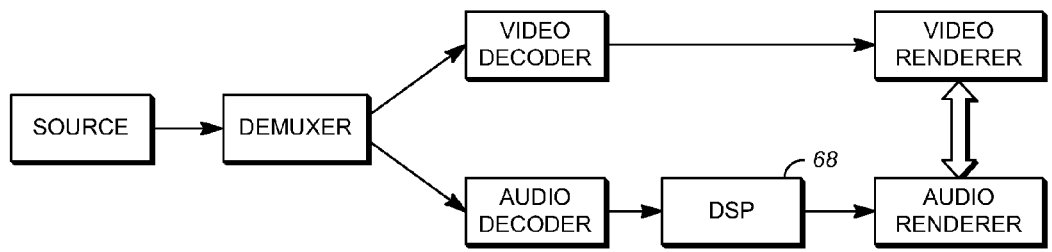

FIG. 3C depicts a post-processing configuration 48c. The post-processing configuration 48c includes the components of basic configuration 48a plus Digital Signal Processing (DSP) 68. DSP 68 can, for example, be configured to take an audio stream output by audio decoder 58 and enhance it by way of digital signal processing.

Figure 3D:
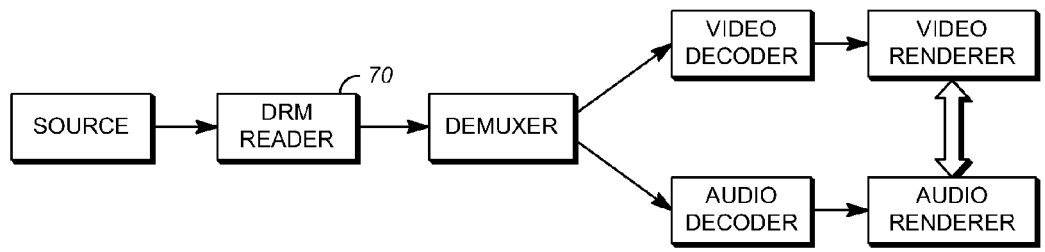

FIG. 3D depicts a digital rights management (DRM) configuration 48d. The DRM configuration 48d includes the components of basic configuration 48a plus DRM reader 70. DRM reader 70 can be configured to accept a media stream that is encoded or encrypted with a DRM scheme. DRM schemes are used to restrict media stream access based on, among other things, user licensing and rights. A component capable of processing one or more DRM schemes, such as DRM reader 70, is needed to read a media stream coded using DRM.

Figure 4A:
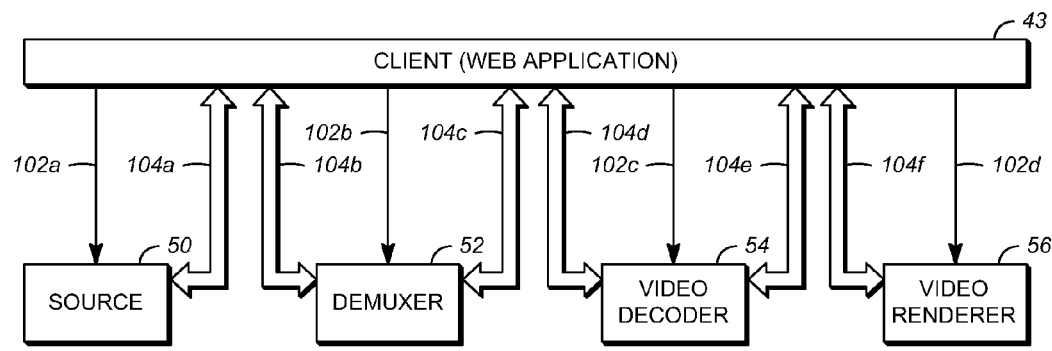
FIG. 4A is a block diagram of an exemplary configurable pipeline including built-in components according to embodiments of the disclosed subject matter.

FIG. 4A is a block diagram of an exemplary basic configurable pipeline 100a including built-in components according to embodiments of the disclosed subject matter. Basic pipeline 100a is controlled by web application 43 and includes source 50, demuxer 52, video decoder 54, and video renderer 56. Also included are control channels 102a-d and data channels 104a-f.

The control channels 102a-d are used to control pipeline 100a. For example, control channels 102a-d can access control functions of the source, components, and renderer of the pipeline to start, stop, pause, fast forward, etc. the processing of the media stream. Control channels 102a-d can include a JavaScript or other interpretive scripting language interface. For example, control channels 102a-d can be accessible by web application 43 via a JavaScript API. In one such implementation, control channels 102a-d are exposed via objects in a document object model (DOM) accessible by the web application 43. In pipeline 100a, control functions are performed individually for each element in the pipeline by web application 43 (i.e. sending a stop control signal to video renderer 56 will not automatically be conveyed to video decoder 54).

The data channels 104a-f are used to pass data between the elements (source, components, and renderer) of pipeline 100a. For example, the incoming media stream is output by source 50 via data channel 104a to web application 43. Web application 43 then can pass the data from source 50 via data channel 104b to demuxer 52. In the pipeline configuration of pipeline 100a, the web application 43 passes data as described above between each element of the pipeline.

The components shown in basic pipeline 100a can be implemented by the web browser 42 on client 30 as native binary components. Native binary components are included with web browser 42 and execute natively on the client 30 on which web browser 42 is implemented. In other words, a binary component can be written in a computer programming language such as C++, and then compiled to machine code that is executable natively on the client that is used to execute web browser 42.

Figure 4B:
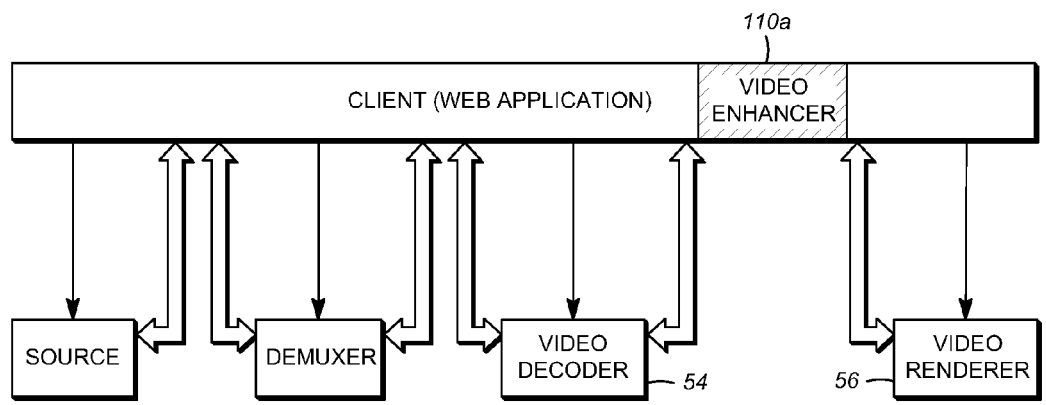
FIG. 4B is a block diagram of an exemplary configurable pipeline including built-in components and an interpretive add-in component according to embodiments of the disclosed subject matter.

FIG. 4B is a block diagram of an exemplary configurable decoder pipeline 100b including built-in components and an interpretive add-in component according to embodiments of the disclosed subject matter. Pipeline 100b includes the components of pipeline 100a, with the addition of video enhancer 110a. Video enhancer 110a is an interpretive add-in component included within web application 43. An interpretive add-in component is one implemented in an interpretive language, such as JavaScript instead of a native binary format. In this case, video enhancer 110a can be included in web application 43 to be used within pipeline 100b.

Web application 43 includes video enhancer 110a in the pipeline 100b by taking data from video decoder 54 via data channel 104e and passing that data to video enhancer 110a. Video enhancer 110a processes the data, and outputs data, which is then passed to video renderer 56 via data channel 104f. In this case, video enhancer 110a is shown, which is a component configured to enhance the decoded video. However, any type of component can be used within the pipeline 100b, including, for example, an advertising overlay component.

The structure of pipeline 100b provides web application 43 access to data input and output of each component in pipeline 100b as well as control of each component. This granular access to the processing pipeline allows great flexibility for a developer of web application 43 to include custom processing steps in, for example, a media stream decoding process.

Figure 4C:
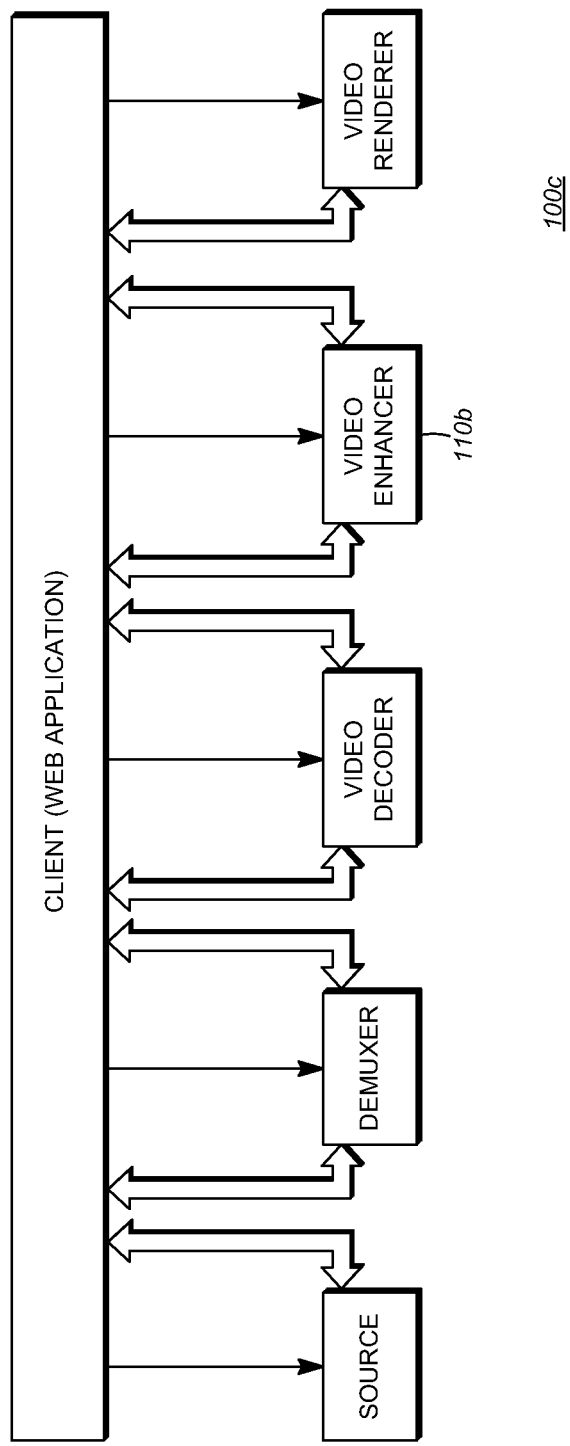
FIG. 4C is a block diagram of an exemplary configurable pipeline including built-in components and a binary add-in component according to embodiments of the disclosed subject matter.

FIG. 4C is a block diagram of an exemplary configurable decoder pipeline 100c including built-in components and a binary add-in component according to embodiments of the disclosed subject matter. Pipeline 100c is similar to pipeline 100b, with the exception of video enhancer 110b. Video enhancer 110b is implemented as a binary add-in component. A binary add-in component is implemented as natively executable code, similar to native binary components. A binary add-in component can be more efficient than an interpretive component because it can execute natively on the client 30.

A binary add-in component can be stored on storage medium accessible via network 28, such as on server 12. The web browser 42 can retrieve the binary add-in component in response to instructions included in web application 43. The binary add-in component and interpretive add-in components can be structured in a common format and can be implemented using one or more standardized Application Programming Interfaces (APIs).

Binary and interpretive add-in components can be used by web application to dynamically change a configurable pipeline in some implementations. For example, video enhancer 110a or 110b could be added into a configurable pipeline for only part of a stream being processed. In another example, video mixer 64 can be added into the configurable pipeline for a certain time period to display advertisements, and then later be removed when the advertisements are no longer shown.

Alternatively, components can be swapped. For example, various implementations of video decoder 54 can be interchanged. A first implementation of video decoder 54 can be configured to decode a first video encoding scheme whereas a second implementation can be configured to decode a second video encoding scheme. The first implementation and second implementation can be interchanged dynamically if the encoding scheme of the stream being decoded changes, or if a new stream with a different encoding scheme is decoded using the configurable pipeline.

Figure 4D:
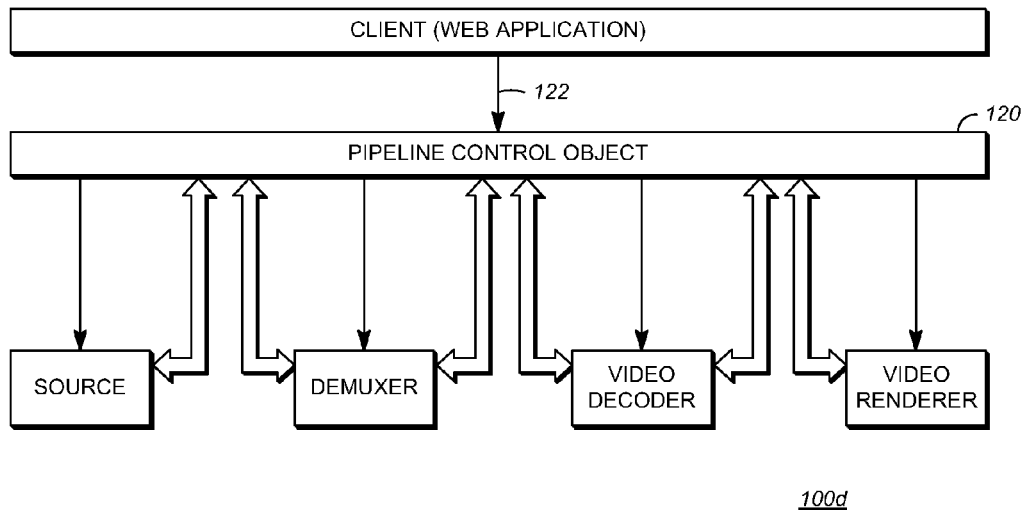
FIG. 4D is a block diagram of an exemplary configurable pipeline including a pipeline control object for controlling the configurable decoder pipeline according to embodiments of the disclosed subject matter.

FIG. 4D is a block diagram of an exemplary configurable pipeline 100d including a pipeline control object 120 for controlling the configurable pipeline 100d according to embodiments of the disclosed subject matter. The pipeline control object 120, which can also be referred to as a pipeline controller, removes granular control of pipeline 100d from the web application 43. Instead, web application 43 can utilize pipeline control channel 122 to control the entire pipeline 100d. The single point of control provided by pipeline control channel 122 can simplify the implementation of web application 43.

The pipeline control channel 122 can be configured to take simple commands from web application 43 and perform more complex control operations with respect to the components of pipeline 100d. In one implementation, pipeline control object 120 is configured with information including: a listing of all components in the configurable pipeline 100d including, for example, the order of components and the type of component; the data passing technique(s) in use; and the functionality of the pipeline (i.e. playback, encoding, etcetera).

Based on the configuration information, pipeline control object 120 can be configured to construct the configurable pipeline during initialization. For example, pipeline control object 120 can instantiate and configure each component and configure the data channels and buffer objects. Once the configurable pipeline is initialized, pipeline control channel 122 can accept commands to control the configurable pipeline.

In one example, pipeline control channel 122 can be configured to accept, for example, "play", "pause", and/or "seek" commands from web application 43. In the instance of "play", pipeline control object 120 can be configured to set each component in the configurable pipeline to the run state. Optionally, a start or other command can be sent to one or more components that require it. In the instance of "pause", pipeline control object 120 can be configured to set each component in the configurable pipeline to the paused state. In the instance of "seek", pipeline control object 120 can be configured to set each component in the configurable pipeline to the pause state, send control signals for each component to flush their input/output ports (i.e. return or deallocate remaining buffer objects), change the location in the stream at the component supplying the stream, and set each component to the run state. Optionally, a start or other command can be sent to one or more components that require it.

Pipeline control channel 122 allows the web application 43 to have a simpler interface to pipeline 100d while still allowing web application 43 to control and configure the components included in pipeline 100d. In one implementation the pipeline control object 120 can be implemented using a native binary module. Such an implementation can improve the efficiency of the pipeline control object 120 as compared to an implementation using, for example, JavaScript.

Figure 4E:
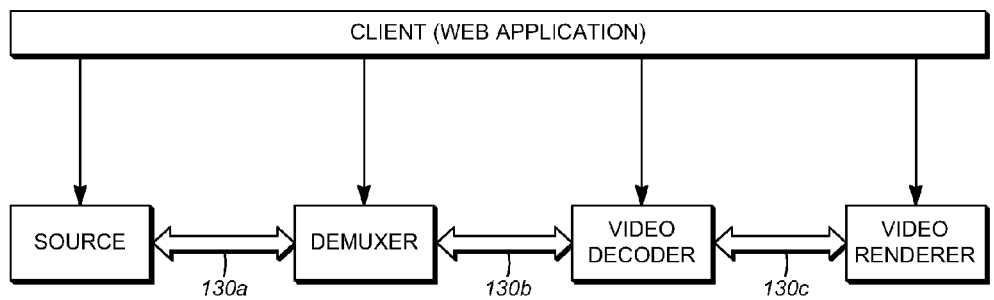
FIG. 4E is a block diagram of an exemplary configurable pipeline including data channels between components in the configurable decoder pipeline according to embodiments of the disclosed subject matter.

FIG. 4E is a block diagram of an exemplary configurable pipeline 100e including data channels between components in the configurable pipeline 100e according to embodiments of the disclosed subject matter. Pipeline 100e is similar to pipeline 100a with the exception that pipeline 100e includes provisions for passing data directly between source, components, and renderer. Data is passed via the data channels 130a-c.

Direct passing of data between elements in the pipeline removes the overhead of having web application 43 pass data from data channel to data channel as is shown in pipeline 100a. Since web application 43 typically processes data using an interpreted scripting language, the improvement in performance by passing data directly between native binary components can be significant. Such an improvement in performance can be useful in applications such as real-time communications. However, the direct passing of data can, in some implementations, prevent the use of an interpretive add-in component. But some implementations may allow for a combination of direct passing of data between pipeline elements and also between pipeline elements and web application 43.

The passing of data via data channels as described with respect to FIGS. 4A-4E can be accomplished using buffer objects. Buffer objects are programming constructs that provide access to memory. Buffer objects can be viewed as a type of memory pointer within web browser 42. Buffer objects can be implemented so that they are accessible using JavaScript by way of the DOM of the web browser 42.

Buffer objects can include some or all of the following elements: data type, data pointer, data size, properties, allocation methods, and accessor methods. The data type of a buffer object indicates what is stored in the memory controlled by the buffer object. For example, data types can include: raw data, compressed stream, uncompressed audio, uncompressed video, etcetera. In some implementations, a buffer object may have a generic data type, wherein any type of data can be stored.

The data pointer can be a memory pointer that includes a memory address of where the buffer object's data is stored. In some implementations, a buffer object may have multiple data pointers. The buffer object also includes at least one data size, which indicates an amount of memory available to the buffer object with reference to the data pointer(s). For example, the data size may be in a number of bytes of available memory.

Buffer object properties can be used to describe some aspect of what is stored in its memory. For example, a property of an audio stream can include its sampling rate. In another example, a property of a video stream can include its color space (i.e. RGB, YUV, etcetera). Available properties can be preset based on the data type. Alternatively or additionally, properties can be custom defined for some buffer object implementations.

Allocation methods are used to allocate memory within the buffer object. The allocation method can be called to allocate memory when the buffer object is created, though in some implementations, it can be called at a later time. In some implementations, memory can only be allocated for a buffer object once. However, in other implementations, the memory available in a buffer object can be changed using the allocation methods over time.

Various implementations of accessor methods can be used to access data stored in a buffer object's memory. Some implementations can allow for direct access to the buffer object memory. In this case, the accessor method would return a memory pointer to allow for direct access to memory. However, such an implementation could be platform dependent (i.e. require differing implementations for various operating systems). A more generic implementation could include copying the data stored in the buffer object to a temporary memory location made accessible outside of the buffer object.

Another implementation of accessor methods can include providing access to data on a less granular basis. In other words, data can be made available on a pixel, block, line, frame, or other level depending on the type of data stored by the buffer object. Alternatively, data can be provided as return values from accessor functions of the buffer object. While such accessor functions may provide a less efficient way to access the data, they would provide a more generic and less platform dependent means of accessing the data.

Figure 5:
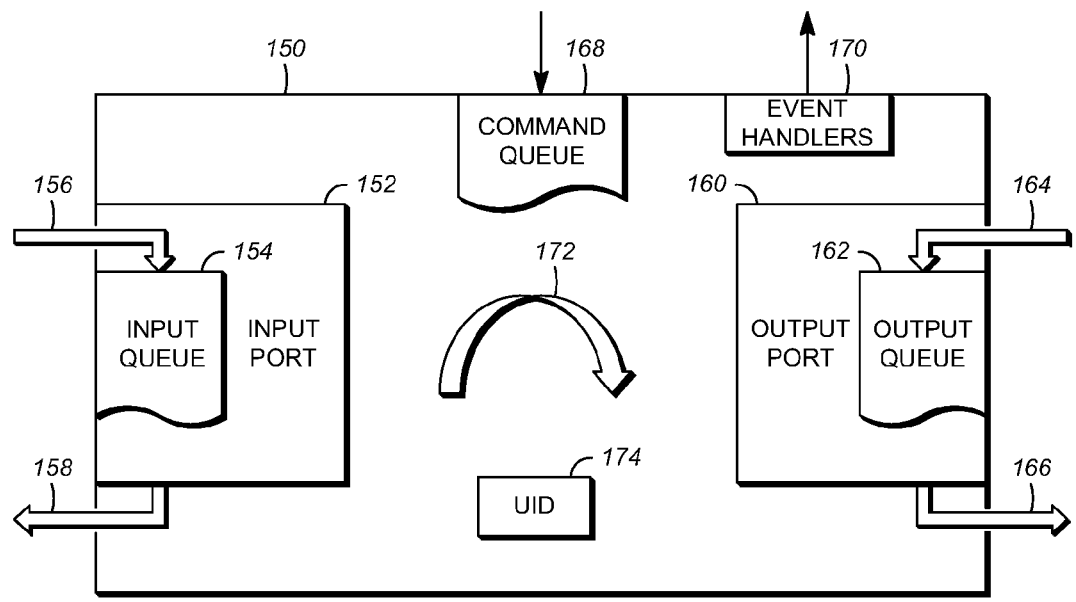
FIG. 5 is a block diagram of an exemplary component according to embodiments of the disclosed subject matter.

FIG. 5 is a block diagram of an exemplary component 150 according to embodiments of the disclosed subject matter. A component is the building block of the pipelines described herein. A component can include any type of processing that involves taking one or more inputs, processing those inputs, and then outputting the results of the processing to one or more outputs. Typically a component will have one input and one output as is shown by exemplary component 150. However in certain situations, it can be advantageous to have multiple inputs and/or multiple outputs. In one example, a demuxer can take a combined audio and video stream, split the audio and video components apart, and output each of the split components to separate outputs. Alternatively, a component can take two video inputs and combine or overlay those inputs into a single output. Either of the above examples can be modified to accommodate combined streams including three or more streams by increasing the number of input or output ports of the component. Depending on a component's purpose, in some implementations, the component can have only inputs (and no outputs) or only outputs (and no inputs).

Exemplary component 150 includes an input port 152. The input port 152 includes an input queue 154, input channel 156, and return channel 158. In one implementation, a circular buffer technique is used to pass data into component 150. The buffer technique includes passing buffer objects into the component via input channel 156. Input queue 154 is used to retrieve the contents of the memory referenced by the buffer objects. Once the contents are retrieved by component 150, the buffer object is returned via return channel 158 so that the memory referenced by the buffer object can be reused. Input port 152 can restrict the type of buffer objects accepted via input channel 156. For example, a video decoder component may only accept a buffer object containing compressed video data.

Exemplary component 150 also includes an output port 160. The output port 160 includes an output queue 162, return channel 164 and output channel 166. In one implementation, a circular buffer technique is used to pass data from component 150. The buffer technique includes passing buffer objects out of the component via output channel 166. The output queue 162 includes buffer objects that are used to store data output by component 150. The buffer objects are sent to the next element in the pipeline by way of output channel 166. Once the output data is retrieved from the buffer objects, they are returned to component 150 by way of return channel 164 so that they can be reused.

Component 150 can also include a command queue 168 and event handlers 170. Command queue 168 can be configured to accept commands for controlling component 150. For example, command queue 168 can include functionality to accept commands from web application 43 through the use of JavaScript code. Possible commands can include, for example, initializing or otherwise changing the state (described later with respect to FIG. 6) of component 150. A component can have attributes that are configurable by web application 43. For example, an audio encoder component can have attributes including encoding bit rate, codec type, and sampling frequency. In another example, a blurring component can have an attribute defining how much to blur the video passed into the component. Components can be controlled asynchronously or synchronously, depending on the implementation and the component.

Event handlers 170 can be configured to provide information to web application 43 of the current state of component 150 and any events occurring in component 150. For example, event handlers 170 can be configured to notify web application 43 when the state of component 150 changes. In another example, a component 150 implementing a decoder can be configured to notify web application 43 upon a change in resolution, frame rate, or color of the video stream being decoded.

The core of component 150 is its processing module 172. Processing module 172 is used to process data retrieved by input port 152 to be output by output port 160. Processing module 172 can include any process for transforming data. For example, processing module 172 can include a decoder, quality enhancer, discrete cosine transform (DCT), digital rights management (DRM) decoder, color filter, resolution scaler, or any other type of processing module. While a component typically will transform the input data to produce a different output data, some components may not change the input data. For example, a component may be configured to simply inspect the data for a particular condition or occurrence.

A component can have a unique identification code (UID) 174 to allow the component to be identified for instantiation by web application 43. UID 174 can be generated using a UID generation process, or may be issued by a centralized UID repository. However, in some implementations, a UID 174 may not be required if the component is, for example, provided by web application 43.

The implementation of component 150 described is exemplary only and alternative implementations are possible and expected. For example, input port 152 and output port 160 may utilize different techniques of memory management to receive and send data. For example, buffer objects may be passed through the component 150 (i.e. instead of returning the pointer via return channel 158, the pointers are used to output data via output channel 166). In such a technique, once at the end of the configurable pipeline, the buffer object's memory can be deallocated, or the buffer object may be passed back to the beginning of the configurable pipeline. Alternatively, some components may include different numbers of input and/or output ports. In some implementations, processing module 172 can include merely storing some or all of a stream to a device or accessing some or all of a stream from a device.

Figure 6:
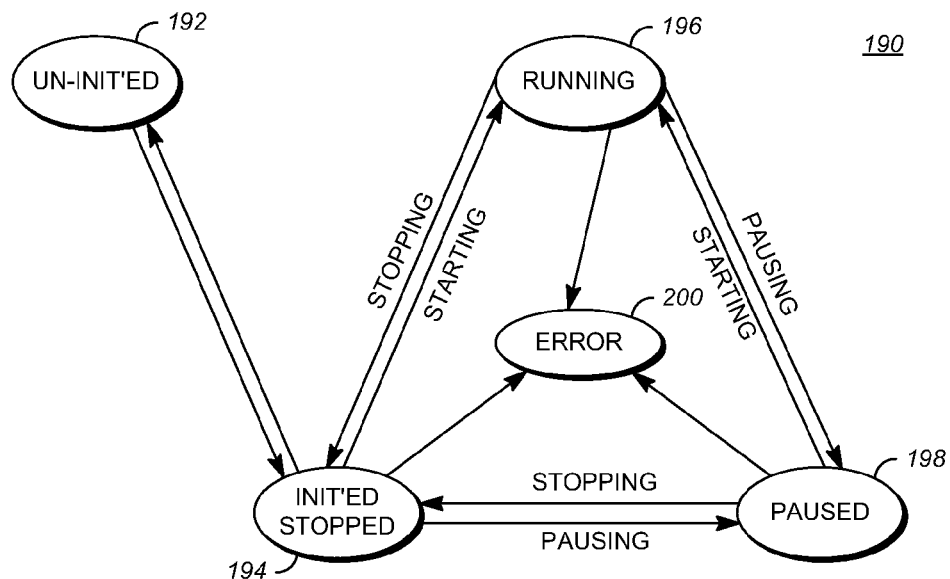
FIG. 6 is an exemplary state diagram relating to the operation of the exemplary component of FIG. 5 according to embodiments of the disclosed subject matter.

FIG. 6 is an exemplary state diagram related to the operation of the exemplary component of FIG. 5 according to embodiments of the disclosed subject matter. Uninitialized component 150 begins in an uninitialized state 192 upon execution. The state of component 150 transitions to initialized/stopped state 194 once the component is initialized. Initialization can include steps such as allocating memory to the input and output ports and initializing variables within component 150. In the initialized/stopped state 194, component 150 does not process, accept, or output data. Once in initialized/stopped state 194, component 150 can transition to any of running state 196, paused state 198, or error state 200.

When in running state 196, component 150 retrieves input data from input port 152, processes the data using processing module 172, and outputs the processed data using output port 160. When in paused state 198, component 150 accepts input data using input port 152, but does not process any of the input data. The component 150 can transition to error state 200 if there is a fatal error and the component is unable to continue to perform normally. When component 150 is in error state 200, web application 43 can be notified by way of, for example, event handlers 170.

The above state diagram 190 is illustrative of only one potential implementation of a component 150. Alternative implementations are possible, including those that add, remove, and modify the states illustrated in state diagram 190.

Figure 7:
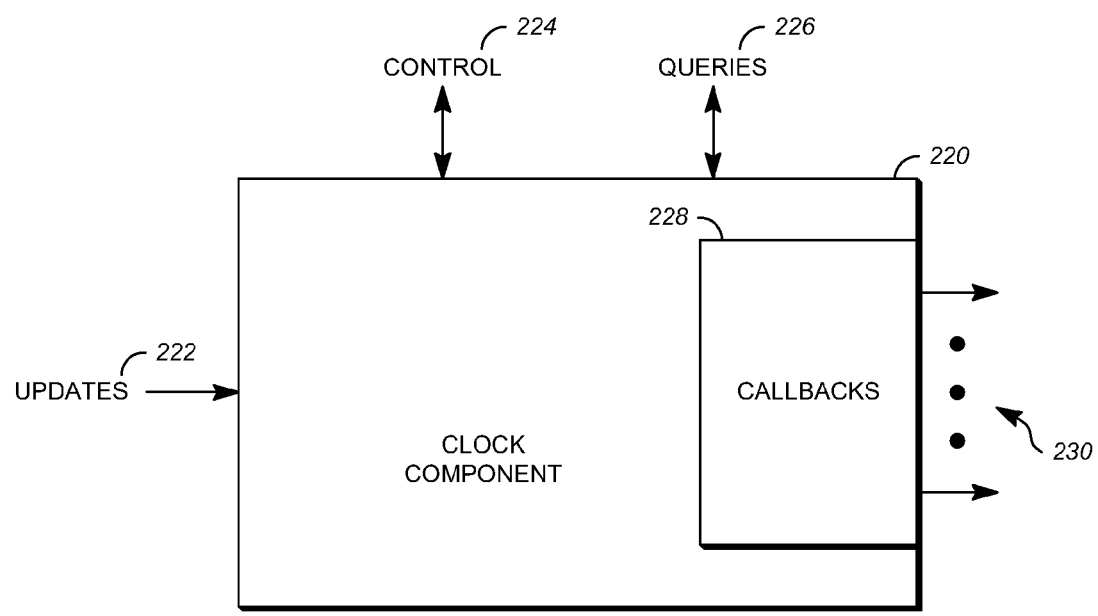
FIG. 7 is a block diagram of an exemplary clock component according to embodiments of the disclosed subject matter.

FIG. 7 is a block diagram of an exemplary clock component 220 according to embodiments of the disclosed subject matter. Clock component 220 provides generic functionality for synchronizing multiple output streams for playback. For example, clock component 220 can be utilized to synchronize the rendering of an output audio stream and an output video stream. In other words, clock component 220 is capable of synchronizing the outputs of various configurable pipelines. This functionality is important to the rendered streams, since the time needed to process and render the various streams through separate configurable pipelines may differ.

In one exemplary implementation, clock component 220 includes updates 222, control 224, queries 226, callback module 228, and callbacks 230. The stream of one configurable pipeline is designated a master stream. The master stream updates clock component 220 via updates 222 with its current media time (i.e. indicating the current location of rendering the stream) and other information that can vary from implementation to implementation. For example, in one implementation, the other information can include playback speed. In a typical implementation, the master stream passes this information to updates 222 on a specific periodic interval. Between the updates, clock component 220 can maintain synchronization using a system clock of client 30. The information can be determined and passed from a renderer component, such as audio renderer 60 for a master audio stream.

Other streams that are to be synchronized by clock component 220 are slave streams output by other configurable pipelines. The slave streams can query for the current media time and other information of the master stream from queries 226 so that the slave streams can synchronize with the master stream. For example, a renderer component, such as video renderer 56 can query information for a slave video stream from queries 226. Alternatively, a renderer component can set up one or more callbacks 230 using callbacks module 228. A callback is a technique whereby a synchronized component can stop processing or "sleep" and be triggered to continue processing by the callback when a particular media time or other condition is reached.

In other implementations, clock component 220 can be used to synchronize streams between components in the same configurable pipeline and before rendering. For example, clock component 220 could be used to synchronize the streams from frame buffer generator 66 and video decoder 54 with respect to mixer configuration 48b.

Clock component 220 can be implemented as a native binary component or as an interpretive add-in component. For example, clock component 220 can be included in web browser 42 as a native binary component to improve the efficiency and ease of use of clock component 220. However, clock component 220 can alternatively be implemented as an interpretive add-in component. Such an implementation permits the use of clock component 220, even when a particular web browser 42 does not natively include clock component 220.

Clock component 220 can be accessed and controlled from web application 43 via control 224 having a JavaScript code API accessible via a DOM interface. For example, the web application 43 can initialize, start, stop, or update the playback speed controlled by clock component 220. Clock component 220 can be controlled similarly to other components in the configurable pipeline(s) that it is a part of, including by web application 43 directly and using an intermediate pipeline control object 120.

The embodiments of server 12 and/or client 30 (and the algorithms, methods, instructions etc. stored thereon and/or executed thereby) can be realized in hardware including, for example, IP cores, ASICSs, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and client 30 do not necessarily have to be implemented in the same manner.

Further, in one example, server 12 or client 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Server 12 and client 30 can, for example, be implemented on computers in a webmail system. Client 30 can be implemented on a device such as a hand-held communications device (i.e. a cell phone). In this instance, server 12 can exchange HTTP communications with the communications device. Other suitable server 12 and client 30 implementation schemes are available. For example, client 30 can be a personal computer rather than a portable communications device.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
   a memory; and
   at least one processor configured to execute instructions stored in the memory to define a component configured based on a standardized interface for use in a configurable pipeline for processing a media stream, the configurable pipeline created within a web browser executed by the at least one processor, the component including:
      at least one input port configured to receive input data from a previous pipeline component, the input data derived from the media stream,
      at least one output port configured to send output data to a next pipeline component;
      a command queue configured to receive commands for the components from a web application executed within the web browser,
      a processing module configured to process the input data into output data, and
      a component UID that uniquely identifies the component, the component UID usable by the web application to identify components for inclusion in the configurable pipeline,
   wherein the component is configured for use in the configurable pipeline by receiving configuration commands from the web application, the configuration commands specifying an input buffer object for use by the at least one input port for receiving the input data and an output buffer object for use by the output port for sending the output data.

2. The apparatus of claim 1, wherein the component is accessible using JavaScript code that is exposed using a Document Object Model interface.

3. The apparatus of claim 2, wherein the component is implemented as one of a native binary component, a binary add-in component, or an interpretive add-in component.

4. The apparatus of claim 1, wherein the component receives commands from the web application via a pipeline control object.

5. An apparatus, comprising:
   a memory; and
   at least one processor configured to execute instructions stored in the memory to define a web browser implemented on a computing device, the web browser comprising:
   a plurality of components for processing a media stream, the plurality of components each including:
      a component UID that uniquely identifies the component, the component UID usable to identify the component for inclusion in a media processing pipeline;
      at least one input port configured to receive input data from a previous pipeline component, the input data derived from the media stream,
      at least one output port configured to send output data to a next pipeline component, and
      a processing module configured to process the input data into output data; and
   a web application that is executable by the web browser, the web application including instructions for configuring the media processing pipeline, the instructions identifying two or more components from the plurality of components for inclusion in the media processing pipeline, a processing order for the two or more components from the plurality of components, and a data passing technique for each of the two or more components from the plurality of components.

6. The apparatus of claim 5, wherein at least some components of the plurality of components further include:
   a command queue configured to receive commands for the components from a web application executed within the web browser; and
   an event handler module configured to send one or more events to the web application based on one or more conditions of the component.

7. The apparatus of claim 6, wherein the component UID for each component is assigned by a centralized authority.

8. The apparatus of claim 6, wherein at least some components of the plurality of components are configured with properties that influence operation of the components, the properties settable responsive to one or more commands from the web application received by the command queue.

9. The apparatus of claim 6, wherein the one or more events includes information of a change in a property of the media stream being processed.

10. The apparatus of claim 6, wherein the command queue and event handler module are each accessible from the web application using JavaScript code by way of a Document Object Model interface.

11. The apparatus of claim 6, wherein the component receives commands from the web application via a pipeline control object.

12. The apparatus of claim 11, wherein at least one of the plurality of components includes at least one output configured to send output data to a next pipeline component and a processing module configured to obtain a media stream for processing.

13. The apparatus of claim 12, wherein at least one of the plurality of components includes at least one input configured to receive input data from a previous pipeline component, the input data derived from the media stream, and a processing module configured to render the input data to an output device.

14. The apparatus of claim 13, wherein the output device is one of a display or an audio card.

15. The apparatus of claim 5, wherein at least some components of the plurality of components are configured to operate within one of a plurality of states, the plurality of states including at least some of an initialized state, a run state, a paused state, and an error state.

16. The apparatus of claim 5, wherein at least some components of the plurality of components are implemented within the web browser as native binary components, and the web browser includes a standardized interface for configuring the one or more configurable pipelines.

17. The apparatus of claim 16, wherein at least some components of the plurality of components are implemented as a binary add-in component or as an interpretive add-in component.

18. A method of operating a component in a media stream processing system implemented using a web browser executed by one or more computing devices, wherein the component is included in a configurable pipeline, the method comprising:

initializing, by the one or more computing devices, the component based on instructions included in a web application executed by the web browser, the initialization including identifying the component using a component UID that uniquely identifies the component, creating a control channel between the web application and the component, and creating a data channel for each of one or more input ports and each of one or more output ports of the component, the data channels operable to pass data to other components in the configurable pipeline;

sending, by the one or more computing devices, a run command to the component, via the control channel, to enter a run state, whereby the component will accept data via at least one of the input ports, process the accepted data, and output the processed data via at least one of the output ports; and sending, by the one or more computing devices, a pause command to the component, via the control channel, to enter a paused state, whereby the component will accept data via at least one of the input ports, but will not process the accepted data and will not output the processed data via the output ports.

\* \* \* \* \*